US009828085B2

(12) United States Patent
Detert

(10) Patent No.: US 9,828,085 B2
(45) Date of Patent: *Nov. 28, 2017

(54) AIRCRAFT FUSELAGES

(71) Applicant: The Boeing Company, Chicago, IL (US)

(72) Inventor: Bruce Raymond Detert, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,943

(22) Filed: Nov. 28, 2016

(65) Prior Publication Data

US 2017/0073061 A1    Mar. 16, 2017

Related U.S. Application Data

(63) Continuation of application No. 14/976,988, filed on Dec. 21, 2015, now Pat. No. 9,505,481, which is a continuation of application No. 13/659,180, filed on Oct. 24, 2012, now Pat. No. 9,216,807.

(51) Int. Cl.
B64C 5/02     (2006.01)
B64C 1/00     (2006.01)
B64C 5/06     (2006.01)
B64F 5/10     (2017.01)
B64F 5/00     (2017.01)

(52) U.S. Cl.
CPC .................. B64C 5/02 (2013.01); B64C 1/00 (2013.01); B64C 1/0009 (2013.01); B64C 5/06 (2013.01); B64F 5/0009 (2013.01); B64F 5/10 (2017.01); B64C 2001/0045 (2013.01)

(58) Field of Classification Search
CPC ............................. B64C 5/02; B64C 2001/045
See application file for complete search history.

(56) References Cited

U.S. PATENT DOCUMENTS 2,874,922 A   2/1959  Whitcomb
3,942,746 A   3/1976  Carter et al.
4,008,867 A   2/1977  Kaniut
(Continued)

FOREIGN PATENT DOCUMENTS

FR        2951434       4/2011
WO        2011048064    4/2011

OTHER PUBLICATIONS

U.S., "Restriction and/or Election Requirement," issued in connection with U.S. Appl. No. 13/659,180, dated May 22, 2014, 8 pages.
U.S., "Non-Final Office Action," issued in connection with U.S. Appl. No. 13/659,180, dated Jul. 21, 2014, 9 pages.
U.S., "Final Office Action," issued in connection with U.S. Appl. No. 13/659,180, dated Mar. 3, 2015, 10 pages.
(Continued)

Primary Examiner — Brian M O'Hara
Assistant Examiner — Michael Kreiner
(74) Attorney, Agent, or Firm — Hanley, Flight & Zimmerman, LLC

(57) ABSTRACT

Aircraft fuselages are disclosed herein. An example apparatus includes a fuselage of an aircraft having a first section and a second section to which a tail assembly is to be coupled. The second section is aft of the first section and is to extend to at least a trailing edge of a horizontal stabilizer of the tail assembly. A first width of the first section decreases from a front to a rear of the first section, and a second width of the second section is substantially constant.

20 Claims, 9 Drawing Sheets

(56) References Cited

U.S. PATENT DOCUMENTS

| | | |
|---|---|---|
| 4,390,150 A | 6/1983 | Whitener |
| 4,976,396 A | 12/1990 | Carlson et al. |
| 5,088,661 A | 2/1992 | Whitener |
| 6,105,902 A | 8/2000 | Pettit |
| 6,273,363 B1 | 8/2001 | Sprenger |
| 6,705,567 B2 * | 3/2004 | Dong .................. B64C 30/00 244/117 R |
| 6,723,363 B2 | 4/2004 | Ziegler et al. |
| D500,980 S | 1/2005 | Eatkins et al. |
| D515,012 S | 2/2006 | Eatkins et al. |
| D515,013 S | 2/2006 | Eatkins et al. |
| D516,995 S | 3/2006 | Eatkins et al. |
| D529,857 S | 10/2006 | Eakins et al. |
| D531,954 S | 11/2006 | Eakins et al. |
| D537,029 S | 2/2007 | Eakins et al. |
| D595,211 S | 6/2009 | Cazals |
| 2012/0205490 A1 | 8/2012 | Whitehouse et al. |

OTHER PUBLICATIONS

U.S., "Advisory Action" issued in connection with U.S. Appl. No. 13/659,180, dated May 7, 2015, 3 pages.

U.S., "Notice of Allowance and Fee(s) Due," issued in connection with U.S. Appl. No. 13/659,180, dated Aug. 17, 2015, 7 pages.

European Patent Office, "Extended European Search Report," issued in connection with European Patent Application No. 13189765.4, dated Mar. 3, 2016, 8 pages.

U.S., "Notice of Allowance and Fee(s) Due," issued in connection with U.S. Appl. No. 14/976,988, dated Jul. 13, 2016, 29 pages.

State Intellectual Property Office of China, "Notification of Second Office Action," issued in connection with Chinese Patent Application No. 201310503878.2, dated Jan. 16, 2017, 26 pages.

State Intellectual Property Office of China, "Notification of Third Office Action," issued in connection with Chinese Patent Application No. 201310503878.2, dated Aug. 2, 2017, 16 pages.

* cited by examiner

AIRCRAFT FUSELAGES

RELATED APPLICATION

This patent arises from a continuation of U.S. patent application Ser. No. 14/976,988 (now U.S. Pat. No. 9,505, 481), titled "Aircraft Fuselages," filed Dec. 21, 2015, which is a continuation of U.S. patent application Ser. No. 13/659, 180 (now U.S. Pat. No. 9,216,807), titled "Aircraft Fuselages," filed Oct. 24, 2012. U.S. patent application Ser. Nos. 14/976,988 and 13/659,180 are hereby incorporated by this reference in their entireties.

FIELD

The present disclosure relates generally to aircraft and, more particularly, to aircraft fuselages.

BACKGROUND

An aircraft generally includes a tail assembly coupled to a fuselage. The tail assembly may include a horizontal stabilizer and a vertical stabilizer positioned adjacent a rear end of the fuselage. Typically, the horizontal stabilizer limits pitching motion of a nose of the aircraft, and the vertical stabilizer limits yawing motion of the nose. During flight, air flowing across the fuselage and the tail assembly produces drag on the aircraft.

SUMMARY

An example apparatus includes a fuselage of an aircraft having a first section and a second section to which a tail assembly is to be coupled. The second section is aft of the first section and is to extend to at least a trailing edge of a horizontal stabilizer of the tail assembly. A first width of the first section decreases from a front to a rear of the first section, and a second width of the second section is substantially constant.

Another example apparatus includes a portion of a fuselage to which a tail assembly is to be coupled. The portion of the fuselage includes a first section, a second section and a third section. First lateral surfaces of the first section are converging inboard. The second section is aft of the first section and has substantially parallel second lateral surfaces. The second section is to extend to a trailing edge of a horizontal stabilizer of the tail assembly. The third section is aft of the second section and has third lateral surfaces converging inboard Another example apparatus includes a first section of a fuselage of an aircraft having a first shape such that lateral surfaces of the first section are converging from a front to a rear of the first section by more than ten degrees relative to a longitudinal axis of the fuselage. A vertical stabilizer is to be disposed along a portion of the first section. The example apparatus also includes a second section of the fuselage aft of the first section. The second section has a second shape such that lateral surfaces of the second section are oriented ten degrees or less from being parallel to the longitudinal axis of the fuselage. The second section is to extend to a trailing edge of a horizontal stabilizer.

An example method disclosed herein includes directing first lateral surfaces of a first section of a fuselage of an aircraft to be converging inboard from a front to a rear of the first section. The example method further includes directing second lateral surfaces of a second section of the fuselage to be substantially parallel. The second lateral surfaces are to be aft of the first section and are to extend to at least a trailing edge of a horizontal stabilizer.

The features, functions and advantages that have been discussed can be achieved independently in various examples or may be combined in yet other examples further details of which can be seen with reference to the following description and drawings.

Figure 1:
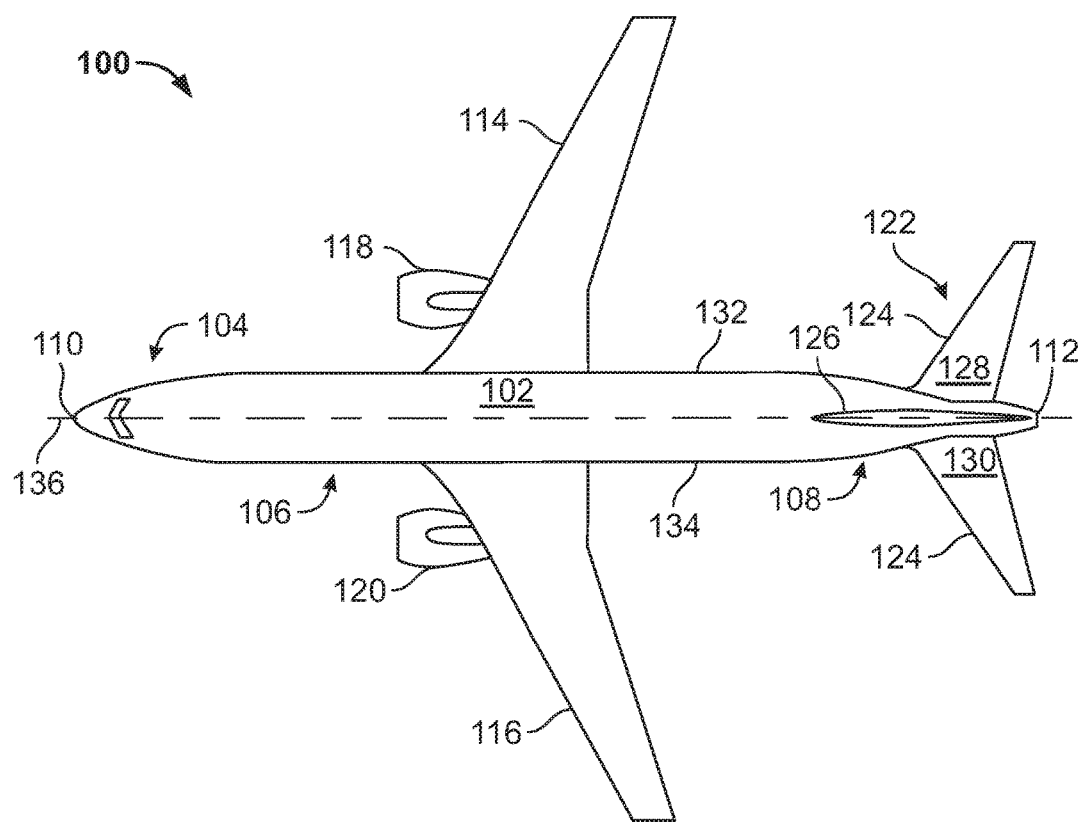
FIG. 1 is a top view of an example aircraft disclosed herein.

Wherever possible, the same reference numbers will be used throughout the drawing(s) and accompanying written description to refer to the same or like parts. As used in this disclosure, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Aircraft fuselages are disclosed herein. An example apparatus includes a fuselage of an aircraft having a first section and a second section to which a tail assembly is to be coupled. In some examples, the tail assembly includes a horizontal stabilizer and a vertical stabilizer. The second section may be aft of the first section and may extend to a trailing edge of the horizontal stabilizer. In some examples, a first width of the first section decreases from a front to a rear of the first section, and a second width of the second section is substantially constant. The example apparatus may include a third section aft of the second section. In some such examples, the third section may have a third width decreasing from a front to a rear of the third section. During flight, air flowing over the tail portion produces drag on the aircraft. However, the shape of the example tail portion substantially prevents air flow separation along the tail portion of the fuselage.

FIG. 1 is a top view of an example aircraft 100 disclosed herein. In the illustrated example, the aircraft 100 includes a fuselage 102 having a nose portion 104, a central portion 106, and a tail portion 108. In the illustrated example, the nose portion 104 defines a nose-end 110, and the tail portion 108 defines a tail-end 112. A first wing 114 and a second wing 116 are coupled to the central portion 106 of the example fuselage 102. In the illustrated example, a first engine 118 and a second engine 120 are coupled to the first wing 114 and the second wing 116, respectively. The aircraft 100 illustrated in FIG. 1 is merely an example. Thus, other types of aircraft may be used without departing from the scope of this disclosure.

The example aircraft 100 of FIG. 1 includes a tail assembly 122 (e.g., an empennage) coupled to the tail portion 108 of the fuselage 102. In the illustrated example, the tail assembly 122 includes a horizontal stabilizer 124 and a vertical stabilizer 126. The example horizontal stabilizer 124 includes a first fixed wing 128 and a second fixed wing 130. In the illustrated example, the first fixed wing 128 is disposed on a first side 132 of the fuselage 102, and the second fixed wing 130 is disposed on a second side 134 of the fuselage 102 opposite the first side 132. In some examples, the horizontal stabilizer 124 includes one or more elevators to control a pitch (e.g., up-and-down motion) of the nose-end 110 of the aircraft 100. In the illustrated example, the vertical stabilizer 126 is disposed along a longitudinal axis 136 of the fuselage 102. In some examples, the vertical stabilizer 126 includes a rudder to control a yaw (side-to-side motion) of the nose-end 110 of the aircraft 100.

Figure 2:
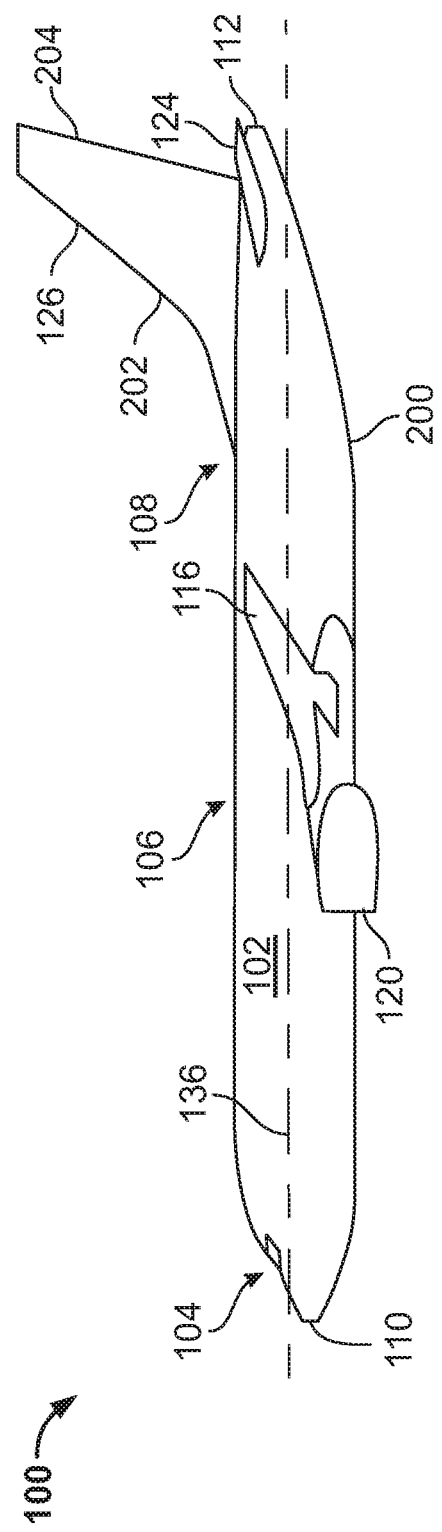
FIG. 2 is a side view of the example aircraft of FIG. 1.

FIG. 2 is a side view of the example aircraft 100 of FIG. 1. In the illustrated example, the tail portion 108 of the fuselage 102 defines an upsweep 200. The example vertical stabilizer 126 includes a leading edge 202 and a trailing edge 204. In the illustrated example, the leading edge 202 of the vertical stabilizer 126 extends from the fuselage 102 fore of the horizontal stabilizer 124.

Figure 3:
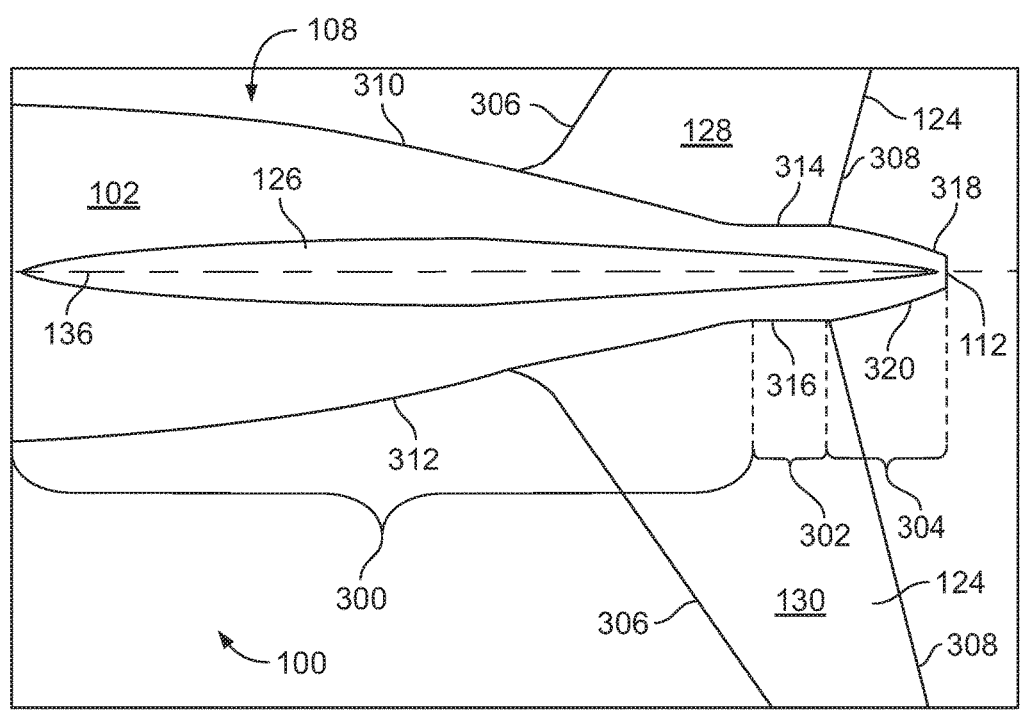
FIG. 3 is a top view of a tail portion of a fuselage of the example aircraft of FIGS. 1-2.

FIG. 3 is a top view of the tail portion 108 of the example fuselage 102. In the illustrated example, the tail portion 108 includes a first section 300, a second section 302 and a third section 304. In the illustrated example, the tail assembly 122 is disposed on the first section 300 and the second section 302. The example third section 304 is disposed aft of the tail assembly 122. In the illustrated example, the first section 300 extends from about the leading edge 202 of the vertical stabilizer 126 to a position along a chord of the horizontal stabilizer 124 (i.e., a position between a leading edge 306 and a trailing edge 308 of the horizontal stabilizer 124). In other examples, the first section 300 extends to and from other positions along the aircraft 100. The example second section 302 extends from the first section 300 (i.e., from the position along the chord of the horizontal stabilizer 124) to the trailing edge 308 of the horizontal stabilizer 124. In other examples, the second section 302 extends to and from other positions along the aircraft 100 (e.g., the second section 302 may extend up to a position fore of the trailing edge 308 of the horizontal stabilizer, the second section 302 may extend aft of the trailing edge 308 of the horizontal stabilizer, etc.). The example third section 304 of FIG. 3 extends from the second section 302 (i.e., from the trailing edge 308 of the horizontal stabilizer 124) to the rear-end 112 of the fuselage 102. Thus, in the illustrated example, the third section 304 is aft of the horizontal stabilizer 124. In other examples, the third section 304 extends to and from other positions along the aircraft 100.

The example first section 300 has a first shape. In the illustrated example, a first width of the first section 300 decreases rearwards (i.e., from a front to a rear of the first section 300). Thus, first lateral surfaces 310 and 312 of the fuselage 102 along the first section 300 are converging inboard. In some examples, the first width of the first section 300 decreases at a constant rate (i.e., the first lateral surfaces 310 and 312 of the fuselage 102 along the first section 300 are substantially straight). In other examples, the first width decreases at an inconstant or varying rate (i.e., the first lateral surfaces 310 and 312 are curved). In the illustrated example, the first lateral surfaces 310 and 312 are converging inboard by more than ten degrees relative to the longitudinal axis 136 of the fuselage 102. In other examples, the first section 300 is other shapes and, thus, the first lateral surfaces 310 and 312 may converge via greater or lesser angles.

In the illustrated example, the second section 302 has a second shape in which a second width of the second section 302 is substantially constant (i.e., second lateral surfaces 314 and 316 of the fuselage 102 along the example second section 302 are oriented within about ten degrees of being parallel to the longitudinal axis 136 of the fuselage 102). The example second lateral surfaces 314 and 316 of FIG. 3 are parallel to the longitudinal axis 136 of the fuselage 102. As described in greater detail below, other examples have other shapes.

The example third section 304 of FIG. 3 has a third shape. In the illustrated example, a third width of the third section 304 decreases rearwards (i.e., from a front to a rear of the third section 304). Thus, third lateral surfaces 318 and 320 of the fuselage 102 along the third section 304 converge inboard. In some examples, the third width of the third section 304 decreases at a constant rate (e.g., the third lateral surfaces 318 and 320 of the fuselage 102 along the third section 304 are substantially straight). In other examples, the third width decreases at an inconstant or varying rate (e.g., the third lateral surfaces 318 and 320 are curved). In the illustrated example, the third lateral surfaces 318 and 320 are converging by more than ten degrees relative to the longitudinal axis 136 of the fuselage 102. In other examples, the third section 304 is other shapes and, thus, the third lateral surfaces 318 and 320 may converge via greater or lesser angles. In the illustrated example, the third section 304 defines the tail-end 112.

Figure 4:
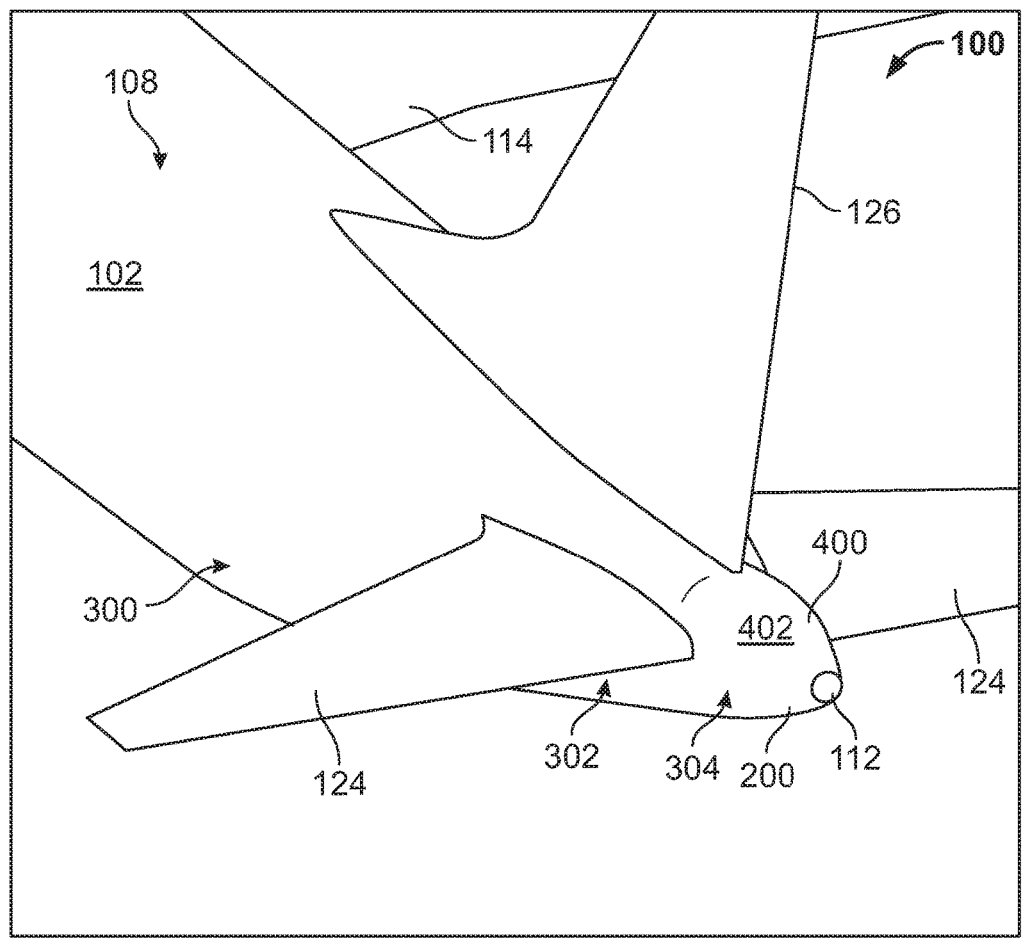
FIG. 4 is a perspective view of the tail portion of the example fuselage of FIGS. 1-3.

FIG. 4 is a perspective view of the tail portion 108 of the example fuselage 102. In the illustrated example, as the third width of the third section 304 decreases, the third section 304 also defines a downsweep 400 (i.e., a top surface 402 of the third section 304 curves downward in the orientation of FIG. 4) and a portion of the upsweep 200. As a result, the example tail-end 112 of the fuselage 102 has a circular cross-section. In the illustrated example, the tail-end 112 is substantially perpendicular to the longitudinal axis 136 of the fuselage 102. However, the above-noted shapes are merely examples and, thus, other shapes (e.g., conical, etc.) may be used without departing from the scope of this disclosure.

Figure 5:
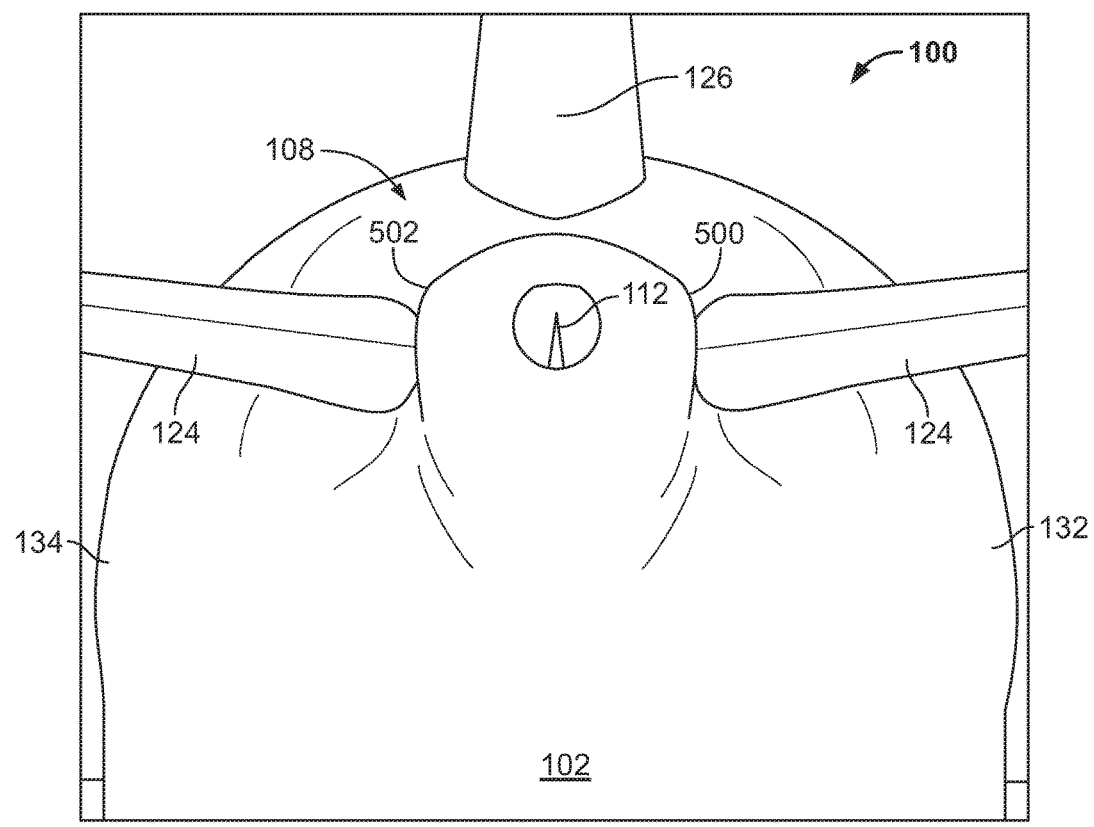
FIG. 5 is a rear view of the example fuselage of FIGS. 1-4.

FIG. 5 is a rear view of the tail portion 108 of the example fuselage 102. In the illustrated example, the first side 132 and the second side 134 of the fuselage 102 along the second section 302 define a first planar surface 500 and a second planar surface 502, respectively. In the illustrated example, the first planar surface 500 and the second planar surface 502 are substantially parallel to a longitudinal axis of the vertical stabilizer 126. Other examples are other shapes.

During flight, air passing over the fuselage 102 and the tail assembly 122 produces drag on the example aircraft 100. However, the example shapes of the first section 300, the second section 302 and/or the third section 304 of the tail portion 108 substantially prevent air flow separation along the tail portion 108 of the fuselage 102. As a result, the example fuselage 102 of FIGS. 1-5 produces about one percent less drag than a fuselage 102 having a tail portion 108 with a width that decreases at a constant rate or progression but is otherwise substantially similar to the example fuselage 102 of FIGS. 1-5.

Figure 6:
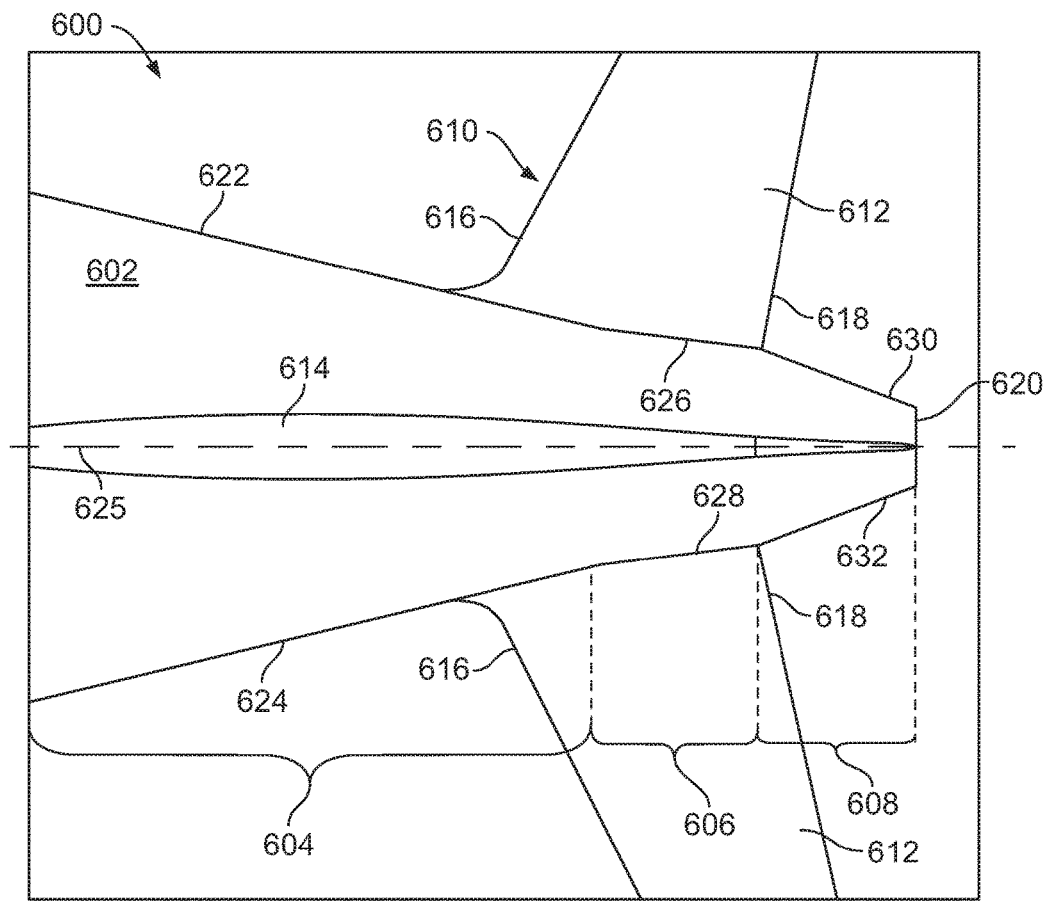
FIG. 6 is a top view of a tail portion of another example fuselage disclosed herein.

FIG. 6 illustrates a tail portion 600 of another example fuselage 602 disclosed herein. In the illustrated example, the tail portion 600 includes a first section 604, a second section 606 and a third section 608. In the illustrated example, a tail assembly 610 is disposed on the first section 604 and the second section 606. In the illustrated example, the tail assembly 610 includes a horizontal stabilizer 612 and a vertical stabilizer 614. The example third section 608 is disposed aft of the tail assembly 610. In the illustrated example, the first section 604 extends from fore of the vertical stabilizer 614 to a position along a chord of the horizontal stabilizer 612 (i.e., a position between a leading edge 616 and a trailing edge 618 of the horizontal stabilizer 612). In other examples, the first section 604 extends to and from other positions along the fuselage 602 (e.g., up to the leading edge 616 of the horizontal stabilizer). The example second section 606 of FIG. 6 extends from the first section 604 (i.e., from the position along the chord of the horizontal stabilizer 612) to the trailing edge 618 of the horizontal stabilizer 612. In other examples, the second section 606 extends to and from other positions along the fuselage 602. The example third section 608 of FIG. 6 extends from the second section 606 (i.e., from the trailing edge 618 of the horizontal stabilizer 612) to a rear-end 620 of the fuselage 602. Thus, in the illustrated example, the third section 608 is aft of the horizontal stabilizer 612. In other examples, the third section 608 extends to and from other positions along the fuselage 602.

The example first section 604 has a first shape. In the illustrated example, a first width of the first section 604 decreases rearwards (i.e., from a front to a rear of the first section 604). Thus, first lateral surfaces 622 and 624 of the fuselage 602 along the first section 604 are converging inboard. In some examples, the first width of the first section 604 decreases at a constant rate (i.e., the first lateral surfaces 622 and 624 of the fuselage 602 along the first section 604 are substantially straight). In other examples, the first width decreases at an inconstant or varying rate (i.e., the first lateral surfaces 622 and 624 are curved). In the illustrated example, the first lateral surfaces 622 and 624 are converging inboard by more than ten degrees relative to a longitudinal axis 625 of the fuselage 602. In other examples, the first section 604 is other shapes and, thus, the first lateral surfaces 622 and 624 may converge via greater or lesser angles.

In the illustrated example, the second section 606 has a second shape in which a second width of the second section 606 is substantially constant (i.e., second lateral surfaces 626 and 628 of the fuselage 602 along the example second section 606 are oriented within about ten degrees of being parallel to the longitudinal axis 625 of the fuselage 602). In the illustrated example, the second lateral surfaces 626 and 628 are converging inboard such that the second lateral surfaces 626 and 628 are oriented about five degrees from parallel to the longitudinal axis 625 of the fuselage 602. However, the above noted-shape is merely an example and, thus, other shapes may be used without departing from the scope of this disclosure.

The example third section 608 has a third shape. In the illustrated example, a third width of the third section 608 decreases rearwards (i.e., from a front to a rear of the third section 608). Thus, third lateral surfaces 630 and 632 of the fuselage 602 along the third section 608 converge inboard. In some examples, the third width of the third section 608 decreases at a constant rate (e.g., the third lateral surfaces 630 and 632 of the fuselage 602 along the third section 608 are substantially straight). In other examples, the third width decreases at an inconstant or varying rate (e.g., the third lateral surfaces 630 and 632 are curved). In the illustrated example, the third lateral surfaces 630 and 632 are converging by more than ten degrees relative to the longitudinal axis 625 of the fuselage 602. In other examples, the third section 608 is other shapes and, thus, the third lateral surfaces 630 and 632 may converge via greater or lesser angles. In the illustrated example, the third section 608 defines the tail-end 620 of the fuselage 602.

Figure 7:
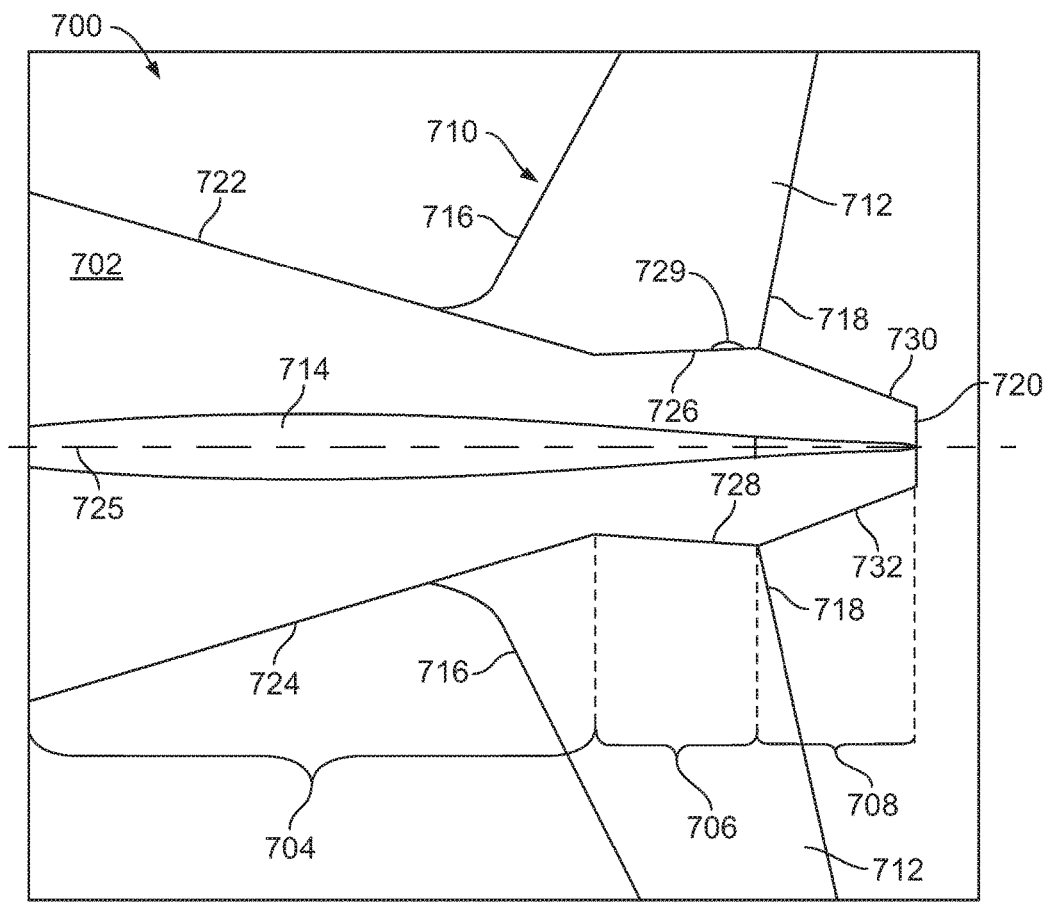
FIG. 7 is a top view of a tail portion of yet another example fuselage disclosed herein.

FIG. 7 illustrates a tail portion 700 of another example fuselage 702 disclosed herein. In the illustrated example, the tail portion 700 includes a first section 704, a second section 706 and a third section 708. In the illustrated example, a tail assembly 710 is disposed on the first section 704 and the second section 706. In the illustrated example, the tail assembly 710 includes a horizontal stabilizer 712 and a vertical stabilizer 714. The example third section 708 is disposed aft of the tail assembly 710. In the illustrated example, the first section 704 extends from fore of the vertical stabilizer 714 to a position along a chord of the horizontal stabilizer 712 (i.e., a position between a leading edge 716 and a trailing edge 718 of the horizontal stabilizer 712). In other examples, the first section 704 extends to and from other positions along the fuselage 702 (e.g., up to the leading edge 716 of the horizontal stabilizer 712). The example second section 706 extends from the first section 704 (i.e., from the position along the chord of the horizontal stabilizer 712) to the trailing edge 718 of the horizontal stabilizer 712. In other examples, the second section 706 extends to and from other positions along the fuselage 702. The example third section 708 of FIG. 7 extends from the second section 706 (i.e., from the trailing edge 718 of the horizontal stabilizer 712) to a rear-end 720 of the fuselage 702. Thus, in the illustrated example, the third section 708 is aft of the horizontal stabilizer 712. In other examples, the third section 708 extends to and from other positions along the fuselage 702.

The example first section 704 has a first shape. In the illustrated example, a first width of the first section 704 decreases rearwards (i.e., from a front to a rear of the first section 704). Thus, first lateral surfaces 722 and 724 of the fuselage 702 along the first section 704 are converging inboard. In some examples, the first width of the first section 704 decreases at a constant rate (i.e., the first lateral surfaces 722 and 724 of the fuselage 702 along the third section 708 are substantially straight). In other examples, the first width decreases at an inconstant or varying rate (i.e., the first lateral surfaces 722 and 724 are curved). In the illustrated example, the first lateral surfaces 722 and 724 are converging inboard by more than ten degrees relative to a longitudinal axis 725 of the fuselage 702. In other examples, the first section 704 is other shapes and, thus, the first lateral surfaces 722 and 724 may converge via greater or lesser angles.

In the illustrated example, the second section 706 has a second shape in which a second width of the second section 706 is substantially constant (i.e., second lateral surfaces 726 and 728 of the fuselage 702 along the example second section 706 are oriented within about ten degrees of being parallel to the longitudinal axis 725 of the fuselage 702). In the illustrated example, the second lateral surfaces 726 and 728 are diverging outboard such that the second lateral surfaces 726 and 728 are oriented about five degrees from parallel to the longitudinal axis 725 of the fuselage 702. However, the orientation of the second lateral surfaces 726 and 728 of FIG. 7 is merely an example. Thus, in other examples, the second lateral surfaces 726 and 728 have other orientations.

In the illustrated example, a projection 729 extends from the second lateral surface 726. In some examples, the projection 729 is coupled to the second lateral surface 726. In other examples, the projection 729 and the second lateral surface 726 are integrally formed. In the illustrated example, the projection 729 curves outward relative to the second lateral surface 726. The projection 729 may be a cover or housing surrounding some or all of one or more components disposed inside the tail portion 700. In some examples, the projection 729 defines an outlet such as, for example, an exhaust outlet. Further, the above noted-shapes are merely examples and, thus, other shapes may be used without departing from the scope of this disclosure. In some examples, the projection 729 is disposed in a different position along the tail portion 700 than illustrated in FIG. 7 (e.g., along the first section 704, the third section 708, the other second lateral surface 728, an upsweep, etc.). Although the illustrated example includes the projection 729, other examples include other projections and/or no projections. In some examples, the tail portion 700 includes one or more recesses.

The example third section 708 has a third shape. In the illustrated example, a third width of the third section 708 decreases rearwards (i.e., from a front to a rear of the third section 708). Thus, third lateral surfaces 730 and 732 of the fuselage 702 along the third section 708 converge inboard. In some examples, the third width of the third section 708 decreases at a constant rate (e.g., the third lateral surfaces 730 and 732 of the fuselage 702 along the third section 708 are substantially straight). In other examples, the third width decreases at an inconstant or varying rate (e.g., the third lateral surfaces 730 and 732 are curved). In the illustrated example, the third lateral surfaces 730 and 732 are converging by more than ten degrees relative to the longitudinal axis 725 of the fuselage 702. In other examples, the third section 708 is other shapes and, thus, the third lateral surfaces 730 and 732 may converge via greater or lesser angles. In the illustrated example, the third section 708 defines the tail-end 720 of the fuselage 702.

Figure 8:
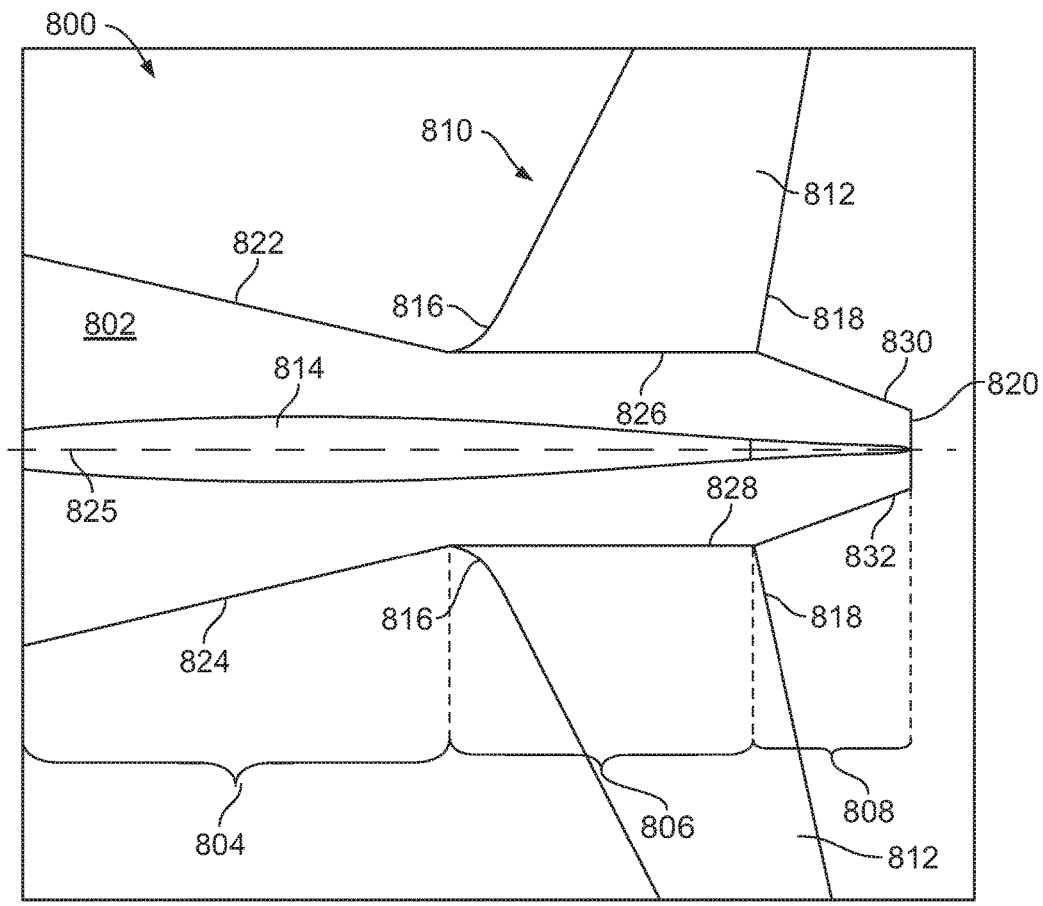
FIG. 8 is a top view of a tail portion of another example fuselage disclosed herein.

FIG. 8 illustrates a tail portion 800 of another example fuselage 802 disclosed herein. In the illustrated example, the tail portion 800 includes a first section 804, a second section 806 and a third section 808. In the illustrated example, a tail assembly 810 is disposed on the first section 804 and the second section 806. In the illustrated example, the tail assembly 810 includes a horizontal stabilizer 812 and a vertical stabilizer 814. The example third section 808 is disposed aft of the tail assembly 810.

In the illustrated example, the first section 804 extends from fore of the vertical stabilizer 814 to a leading edge 816 of the horizontal stabilizer 812. In other examples, the first section 804 extends to and from other positions along the fuselage 802. The example second section 806 extends from the first section 804 (i.e., from the leading edge 816 of the horizontal stabilizer 812) to a trailing edge 818 of the horizontal stabilizer 812. Thus, the example second section 804 of FIG. 8 extends a distance corresponding to a length of a chord of the horizontal stabilizer 812. The example third section 808 of FIG. 8 extends from the second section 806 (i.e., from the trailing edge 818 of the horizontal stabilizer 812) to a rear-end 820 of the fuselage 802. Thus, in the illustrated example, the third section 808 is aft of the horizontal stabilizer 812.

The example first section 804 has a first shape. In the illustrated example, a first width of the first section 804 decreases rearwards (i.e., from a front to a rear of the first section 804). Thus, first lateral surfaces 822 and 824 of the fuselage along the first section 804 are converging inboard. In some examples, the first width of the first section 804 decreases at a constant rate (i.e., the first lateral surfaces 822 and 824 of the fuselage along the third section 808 are substantially straight). In other examples, the first width decreases at an inconstant or varying rate (i.e., the first lateral surfaces 822 and 824 are curved). In the illustrated example, the first lateral surfaces 822 and 824 are converging inboard by more than ten degrees relative to a longitudinal axis 825 of the fuselage 802. In other examples, the first section 804 is other shapes and, thus, the first lateral surfaces 822 and 824 may converge via greater or lesser angles.

In the illustrated example, the second section 806 has a second shape in which a second width of the second section 806 is substantially constant (i.e., second lateral surfaces 826 and 828 of the fuselage along the example second section 806 are oriented within about ten degrees of being parallel to the longitudinal axis 825 of the fuselage 802). In the illustrated example, the second lateral surfaces 826 and 828 are parallel to the longitudinal axis 825 of the fuselage 802. However, the above noted-shape is merely an example and, thus, other shapes may be used without departing from the scope of this disclosure.

The example third section 808 has a third shape. In the illustrated example, a third width of the third section 808 decreases rearwards (i.e., from a front to a rear of the third section 808). Thus, third lateral surfaces 830 and 832 of the fuselage 802 along the third section 808 converges inboard. In some examples, the third width of the third section 808 decreases at a constant rate (e.g., the third lateral surfaces 830 and 832 of the fuselage 802 along the third section 808 are substantially straight). In other examples, the third width decreases at an inconstant or varying rate (e.g., the third lateral surfaces 830 and 832 are curved). In the illustrated example, the third lateral surfaces 830 and 832 are converging by more than ten degrees relative to the longitudinal axis 825 of the fuselage 802. In other examples, the third section 808 is other shapes and, thus, the third lateral surfaces 830 and 832 may converge via greater or lesser angles. In the illustrated example, the third section 808 defines the tail-end 820 of the fuselage 802.

Figure 9:
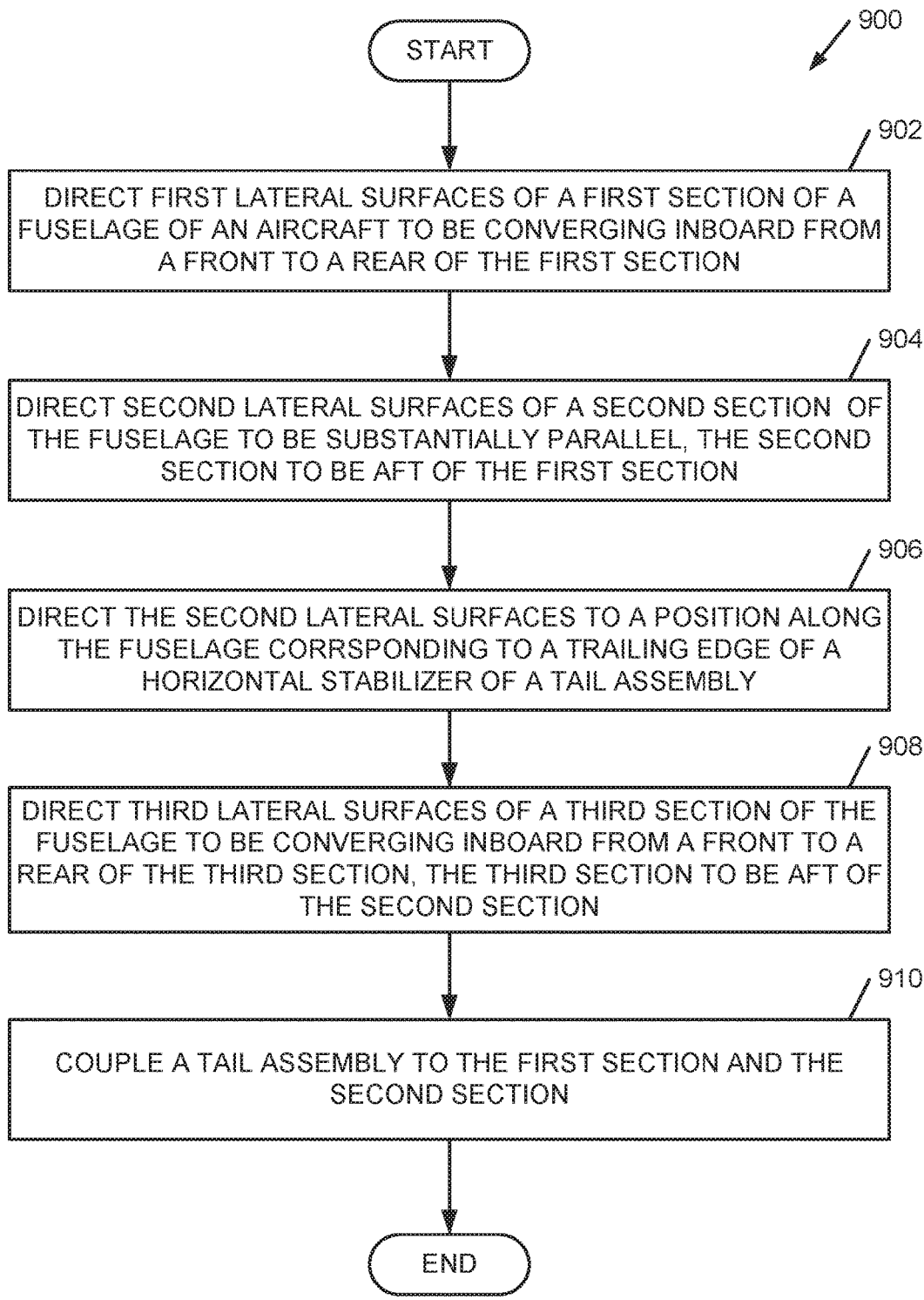
FIG. 9 is a flow chart representative of an example method disclosed herein.

FIG. 9 depicts an example flow diagram representative of methods or processes that may be implemented using, for example, computer readable instructions. The example process of FIG. 9 may be performed using a processor, a controller and/or any other suitable processing device. For example, the example process of FIG. 9 may be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process of FIG. 9 may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process of FIG. 9 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more operations depicted in FIG. 9 may be implemented manually or as any combination(s) of any of the foregoing techniques, for example, any combination of firmware, software, discrete logic and/or hardware.

Further, although the example process of FIG. 9 is described with reference to the flow diagram of FIG. 9, other methods of implementing the process of FIG. 9 may be employed. For example, the order of execution of the blocks may be changed, and/or some of the blocks described may be changed, eliminated, sub-divided, or combined. Additionally, one or more of the operations depicted in FIG. 9 may be performed sequentially and/or in parallel by, for example, separate processing threads, processors, devices, discrete logic, circuits, etc.

FIG. 9 is a flowchart representative of an example method 900 that can be performed to improve aerodynamic performance of an aircraft. With reference to FIGS. 1-8, the example method 900 of FIG. 9 begins by directing the first lateral surfaces 310 and 312 of the first section 300 of the fuselage 108 to be converging inboard from a front to a rear of the first section 300 (block 902). In some examples, the first lateral surfaces 310 and 312 are directed from fore of a first position along the fuselage 108 corresponding to a leading edge 202 of the vertical stabilizer 126 to or past a second position along the fuselage 108 corresponding to the leading edge 616 of the horizontal stabilizer 124.

At block 904, the second lateral surfaces 314 and 316 of the second section 302 are directed to be substantially parallel. The second section 302 and, thus, the second lateral surfaces 314 and 316 are aft of the first section 300. In some examples, the second lateral surfaces 314 and 316 are directed to be substantially parallel such that the second lateral surfaces 314 and 316 are oriented ten degrees or less from being parallel to the longitudinal axis 136 of the fuselage 108. In some examples, the second lateral surfaces 314 and 316 are directed from the first section 300 (e.g., from the first lateral surfaces 310 and 312, from the second position along the fuselage 108 corresponding to the leading edge 306 of the horizontal stabilizer 124, from a third position aft of the second position, etc.). At block 906, the second lateral surfaces 314 and 316 are directed to a fourth position corresponding to the trailing edge 308 of the horizontal stabilizer 124.

At block 908, the third lateral surfaces 318 and 320 of the third section 304 of the fuselage 108 are directed to be converging from a front to the rear of the third section 304. The third section 304 is aft of the second section 302. In some examples, the third lateral surfaces 318 and 320 are directed from the second section 302 (e.g., from the second lateral surfaces 314 and 316, from the fourth position along the fuselage 108 corresponding to the trailing edge 308 of the horizontal stabilizer, etc.) to the tail-end 112 of the aircraft 100. At block 910, the tail assembly 122 is coupled to the first section 300 and the second section 302. In some examples, the leading edge 306 of the horizontal stabilizer 124 is extended from the first section 300. In other examples, the leading edge 306 of the horizontal stabilizer 124 is extended from the second section 302. The vertical stabilizer 126 may be extended from the first section 300 and/or the second section 302.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. An aircraft comprising:
   a tail portion of a fuselage, the tail portion including a first section, a second section aft of the first section, and a third section aft of the second section, a first width of the first section decreasing from a front to a rear of the first section, a second width of the second section being substantially constant, and a third width of the third section decreasing from a front to a rear of the third section; and
   a horizontal stabilizer extending from the tail portion such that a trailing edge of the horizontal stabilizer extends from the tail portion at an intersection of the second section and the third section and a leading edge of the horizontal stabilizer extends from the tail portion along the first section.

2. The aircraft of claim 1, further including a vertical stabilizer extending from a top surface of the tail portion such that a leading edge of the vertical stabilizer extends from the tail portion fore of the horizontal stabilizer.

3. The aircraft of claim 2, wherein the vertical stabilizer extends from the tail portion along the first and second sections.

4. The aircraft of claim 2, wherein surfaces of the tail portion along the second section are substantially parallel to a longitudinal axis of the vertical stabilizer.

5. The aircraft of claim 1, wherein an outer surface of the first section is angled more than ten degrees relative to a longitudinal axis of the fuselage.

6. The aircraft of claim 5, wherein an outer surface of the third section is angled more than ten degrees relative to the longitudinal axis of the fuselage.

7. The aircraft of claim 1, wherein the second width is substantially constant such that surfaces of the tail portion along the second section are oriented within about ten degrees of parallel to a longitudinal axis of the fuselage.

8. An aircraft comprising:
   a tail portion of a fuselage, the tail portion including a first section, a second section aft of the first section, and a third section aft of the second section, the first section having first lateral surfaces converging inboard, the second section having second lateral surfaces that are parallel to each other, and the third section having third lateral surfaces converging inboard; and
   a horizontal stabilizer extending from the tail portion such that a trailing edge of the horizontal stabilizer extends from the second lateral surfaces at or near an intersection of the second section and the third section.

9. The aircraft of claim 8, wherein a leading edge of the horizontal stabilizer extends from the tail portion along the first section.

10. The aircraft of claim 8, further including a vertical stabilizer extending from a top surface of the tail portion such that a leading edge of the vertical stabilizer extends from the tail portion fore of the horizontal stabilizer.

11. The aircraft of claim 10, wherein the vertical stabilizer extends from the tail portion along the first and second sections.

12. The apparatus of claim 10, wherein the second lateral surfaces are substantially parallel to a longitudinal axis of the vertical stabilizer.

13. The apparatus of claim 8, wherein the first lateral surfaces are angled more than ten degrees relative to a longitudinal axis of the fuselage.

14. The apparatus of claim 13, wherein the third lateral surfaces are angled by more than ten degrees relative to the longitudinal axis of the fuselage.

15. A method of enhancing aerodynamic performance comprising:
   directing first lateral surfaces of a first section of a fuselage of an aircraft to be converging inboard from a front to a rear of the first section;
   directing second lateral surfaces of a second section of the fuselage to be substantially parallel, the second section aft of the first section;
   directing third lateral surfaces of a third section of the fuselage to be converging inboard from a front to a rear of the third section, the third section aft of the second section; and
   coupling a horizontal stabilizer to the fuselage such that a trailing edge of the horizontal stabilizer extends from the fuselage at an intersection of the second section and the third section and a leading edge of the horizontal stabilizer extends from the fuselage along the first section.

16. The method of claim 15, further including coupling a vertical stabilizer to a top surface of the fuselage such that a leading edge of the vertical stabilizer extends from the fuselage fore of the horizontal stabilizer.

17. The method of claim 16, wherein the second lateral surfaces are substantially parallel to a longitudinal axis of the vertical stabilizer.

18. The method of claim 15, wherein the first lateral surfaces are angled more than ten degrees relative to a longitudinal axis of the fuselage.

19. The method of claim 18, wherein the third surfaces are angled more than ten degrees relative to the longitudinal axis of the fuselage.

20. The method of claim 15, wherein the second surfaces are angled by ten degrees or less relative to a longitudinal axis of the fuselage.

* * * * *